No. 650,513. M. F. MIDDLETON. Patented May 29, 1900.
BICYCLE PROP.
(Application filed Sept. 27, 1899.)
(No Model.)
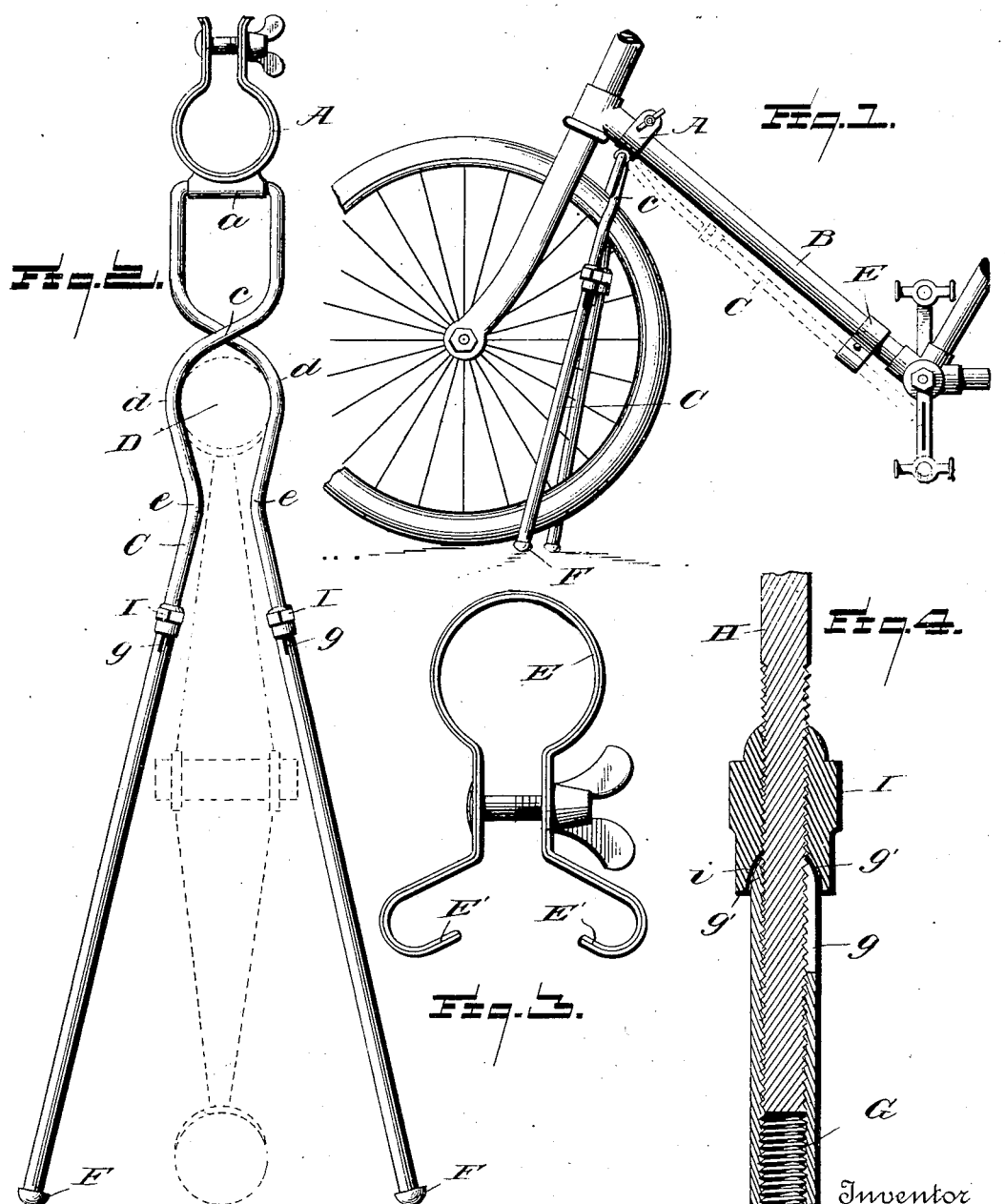
Witnesses
L. C. Hills.
Harry S. Gaither.
Inventor
Melbourne F. Middleton,
By E. N. Bond
Attorney
THE NORRIS PETERS CO., PHOTO-LITHO., WASHINGTON, D. C.

UNITED STATES PATENT OFFICE.

MELBOURNE F. MIDDLETON, OF CAMDEN, NEW JERSEY.

BICYCLE-PROP.

SPECIFICATION forming part of Letters Patent No. 650,513, dated May 29, 1900.

Application filed September 27, 1899. Serial No. 731,834. (No model.)

*To all whom it may concern:*

Be it known that I, MELBOURNE F. MIDDLETON, a citizen of the United States, residing at Camden, in the county of Camden and State of New Jersey, have invented certain new and useful Improvements in Bicycle-Props, of which the following is a specification, reference being had therein to the accompanying drawings.

This invention relates to certain new and useful improvements in props for bicycles and the like of that class which are designed to be pivotally attached to the frame of the vehicle and to normally lie alongside the portion of the frame to which it is attached and there held by a spring-clip or analogous device.

The present invention relates more particularly to that style of such devices as are formed with two legs having sufficient resiliency to keep them in a spread condition when in position to support the bicycle, but permitting of their being drawn together to be held within the clip, so that when not in use the prop or support will lie snugly against the bar of the frame, where it will not only be out of the way, but will not present an unsightly or cumbersome appearance.

The invention has for its objects, among others, to improve upon this style of bicycle-props, to the end that the wheel may be more firmly grasped and held by the prop and constructed to hold the bicycle against backward or forward movement and yet readily disengaged when desired. I provide a novel means of rendering the legs of the prop or support adjustable as to length, so the same may be readily adapted to bicycles of varying height of frame. The prop is formed in such a manner as to engage with the tire of the wheel with a spring tension, being provided with a tire-receiving portion with a contracted entrance, so that as the prop is thrown down and into a position inclined a little forward from the perpendicular it will be forced over the tire, so that it not only grasps the wheel at the tire, but is thus held in the said forwardly-inclined position, which is better suited to the proper holding of the bicycle. Sudden movement of the prop rearward serves to disengage it from the tire of the wheel, and then it may be engaged in the spring-clip by simply pressing the legs together till they may be received in the arms of the clip.

The device is simple, cheap, readily applied to any bicycle, easily operated, and in practice will be found to be most efficient for the purposes for which it is intended.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side elevation of a portion of a bicycle, showing my improved prop in position thereon. Fig. 2 is an elevation of the prop in operative position, the wheel being indicated in position by dotted lines. Fig. 3 is an enlarged detail of the spring-clip. Fig. 4 is an enlarged longitudinal section through a portion of one of the legs of the prop, showing the provision for longitudinal adjustment thereof.

Like letters of reference indicate like parts throughout the several views.

Referring now to the details of the drawings by letter, A designates a clamp or clip designed to be engaged, preferably, on the lower inclined bar B of the bicycle-frame, near the upper end thereof, and to be there held in any suitable manner, in this instance shown as provided with the bolt and thumb-nut, and the inner face of the clip is lined with felt or analogous material, so as to prevent marring of the frame-bar B.

C is the prop or support. It is formed of spring material and at the upper end has a cross portion which is mounted to turn in a bearing or loop *a* of the clip A, as will be readily understood, so that the prop may swing upon the same as a pivot or hinge. At a distance from the cross-bar the material of the prop is bent so that the two portions thereof cross each other, as seen at *c*, and after crossing the two portions are curved, as seen at *d*, to form a substantially-circular portion D, and the wire of the prop is then bent again, as at *e*, to form the contracted entrance to the said circular opening or space, as seen best in Fig. 2, and thence inclined outward, so that the legs of the prop will diverge from the said bends e outward and downward, as will be clearly understood from reference to Fig. 2.

E is a spring-clip designed to be attached to the bar B near its lower end in the position indicated in Fig. 1 and there held in any suitable manner, as by the thumb-nut shown. It may be lined with felt or analogous material to prevent marring of the bar B. This clip is formed with the oppositely-disposed outwardly-extending spring-arms E', as seen best in Fig. 3, which have some inherent resiliency, but are sufficiently rigid to prevent them from being forced outward beyond a certain point by the legs of the prop when the latter are engaged therein.

The lower ends of the legs may be shaped as may be desired. In this instance they are shown as provided with the feet F, which may be of rubber, if preferred.

The manner of use will be apparent. Normally the prop is in its folded condition, as indicated by dotted lines in Fig. 1. When the rider desires to support the bicycle in its vertical position either with or without dismounting, he disengages the legs of the prop from the spring-clip, and by throwing the same forward the legs at the bends e yield, so that the prop can be made to embrace the tire of the wheel, which will be received in the circular opening D, as indicated, and as this is done the prop assumes the forwardly-inclined position in which it is shown by full lines in Fig. 1, and the legs are spread, as indicated in the said view and seen better in Fig. 2. A sudden pull upon the prop rearward will disengage it from the wheel and it may be engaged with the clip E. It is to be understood that before engaging the legs in the spring-arms of the clip E the legs of the prop are forced toward each other in an evident manner.

The incline of the arms E' is considered important for the reason that when the legs are once in position therein it requires two motions to displace them, and such cannot take place in the ordinary course of events in riding.

In order that the prop may be adapted for use with wheels of varying sizes, I may sometimes construct the legs of the prop so they may be extended or shortened. In Fig. 4 I have shown the preferable way of doing this. In this form the one portion G of the leg at one end is made hollow and is interiorly screw-threaded, while the adjacent end of the other portion H is threaded to engage in this screw-threaded socket. The outer end of the hollow portion has its wall slit, as seen at g, and the extreme end tapered or rounded, as seen at g', to be received in the correspondingly-shaped end i of the nut I, which is screwed on the portion H and when screwed home on the portion G binds the slit end thereof fast upon the threaded end of the portion H received therein, and thus secures the two parts in their adjusted position, it being understood that the two portions G and H are adjusted to the required length before the nut is screwed up. This makes a very neat, yet strong and efficient, means of adjustment for the legs of the prop. It is to be understood, however, that the legs are not in all instances to be made adjustable, as the upper portion of the prop will serve its function regardless of the form of the lower portions of the legs.

Modifications in detail may be resorted to without departing from the spirit of the invention or sacrificing any of its advantages.

What I claim as new is—

1. A bicycle-prop having its legs of a length to engage the ground when in their vertical position and crossed to form a spring tire-embracing portion, as set forth.

2. A bicycle-prop having spring-legs of a length to engage the ground and to support a bicycle in a vertical position and provided with a crossed portion intermediate their ends and a spring tire-receiving portion beneath the crossed portion, as and for the purpose specified.

3. A bicycle-prop having spring-legs of a length to engage the ground when in their substantially-vertical position, and a cross portion at the upper end, with a crossed portion integral with the cross portion and a tire-receiving bend between the crossed portion and the lower ends of the legs, as set forth.

4. A bicycle-prop having its leg in sections lengthwise adjustable one within the other, one with a screw-threaded socket with its outer end beveled and longitudinally slit, and the other with threaded portion engaged in said socket, and a nut engaged with the last-mentioned threaded portion and having beveled end to receive the beveled slitted end of the first-mentioned portion substantially as specified.

5. The combination with a bicycle-frame, of a prop pivotally mounted on the upper front end of the lower inclined bar of said frame and having spring-legs of a length to engage the ground and to support a bicycle when in their substantially-vertical position and a crossed portion and substantially-circular tire-receiving part beneath the same, and a spring-clip on said inclined bar to receive the lower ends of the legs of said prop when the latter is folded against said bar, substantially as shown and described.

In testimony whereof I affix my signature in presence of two witnesses.

MELBOURNE F. MIDDLETON.

Witnesses:
E. M. MIDDLETON,
J. T. KING.